US011869520B2

(12) United States Patent

Wang et al.

(10) Patent No.: US 11,869,520 B2

(45) Date of Patent: *Jan. 9, 2024

(54) ENCODING METHOD, DECODING METHOD, ENCODING APPARATUS, AND DECODING APPARATUS

(71) Applicant: Huawei Technologies Co., Ltd., Shenzhen (CN)

(72) Inventors: Bin Wang, Shenzhen (CN); Zexin Liu, Beijing (CN); Lei Miao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/868,879

(22) Filed: Jul. 20, 2022

(65) Prior Publication Data

US 2022/0366922 A1 Nov. 17, 2022

Related U.S. Application Data

(63) Continuation of application No. 16/999,448, filed on Aug. 21, 2020, now Pat. No. 11,430,456, which is a (Continued)

(30) Foreign Application Priority Data

Jan. 15, 2013 (CN) ......................... 201310014342.4

(51) Int. Cl.

*G10L 17/22* (2013.01)
*G10L 19/03* (2013.01)

(Continued)

(52) U.S. Cl.

CPC .............. *G10L 19/03* (2013.01); *G10L 19/12* (2013.01); *G10L 19/26* (2013.01); *G10L 19/265* (2013.01);

(Continued)

(58) Field of Classification Search

USPC ................. 704/205, 211–213, 220, 500–504

See application file for complete search history.

(56) References Cited

U.S. PATENT DOCUMENTS 4,969,192 A 11/1990 Chen et al.
5,307,441 A 4/1994 Tzeng (Continued)

FOREIGN PATENT DOCUMENTS

CN 1484756 A 3/2004
CN 101140759 A2 3/2008

(Continued)

OTHER PUBLICATIONS

Neuendorf, M., et al., "WD on Unified Speech and Audio Coding," ISO/IEC JTC1/SC29/WG11, MPEG2008/N10215, Busan, Korea, Oct. 13, 2008~17, 96 pages.

(Continued)

*Primary Examiner* — Leonard Saint-Cyr

(74) *Attorney, Agent, or Firm* — Conley Rose, P.C.

(57) ABSTRACT

An encoding method includes dividing a to-be-encoded time-domain signal into a low band signal and a high band signal, performing encoding on the low band signal to obtain a low frequency encoding parameter, performing encoding on the high band signal to obtain a high frequency encoding parameter, obtaining a synthesized high band signal, performing short-time post-filtering processing on the synthesized high band signal to obtain a short-time filtering signal, and calculating a high frequency gain based on the high band signal and the short-time filtering signal.

20 Claims, 5 Drawing Sheets

Related U.S. Application Data continuation of application No. 16/238,797, filed on Jan. 3, 2019, now Pat. No. 10,770,085, which is a continuation of application No. 15/677,324, filed on Aug. 15, 2017, now Pat. No. 10,210,880, which is a continuation of application No. 14/721,606, filed on May 26, 2015, now Pat. No. 9,761,235, which is a continuation of application No. PCT/CN2013/080061, filed on Jul. 25, 2013.

(51) Int. Cl.

| | |
|---|---|
| ***G10L 19/26*** | (2013.01) |
| ***G10L 21/038*** | (2013.01) |
| ***G10L 19/12*** | (2013.01) |
| *G10L 19/02* | (2013.01) |
| *G10L 19/00* | (2013.01) |

(52) U.S. Cl.

CPC ........ *G10L 21/038* (2013.01); *G10L 19/0204* (2013.01); *G10L 2019/0016* (2013.01)

(56) References Cited

U.S. PATENT DOCUMENTS

| | | | | |
|---|---|---|---|---|
| 5,495,555 | A | 2/1996 | Swaminathan | |
| 5,642,465 | A * | 6/1997 | Scott | G10L 19/038 704/E19.017 |
| 5,864,798 | A | 1/1999 | Miseki et al. | |
| 6,064,962 | A | 5/2000 | Oshikiri et al. | |
| 6,167,371 | A | 12/2000 | Met et al. | |
| 6,377,915 | B1 | 4/2002 | Sasaki | |
| 6,510,407 | B1 | 1/2003 | Wang | |
| 7,181,402 | B2 | 2/2007 | Jax et al. | |
| 7,469,206 | B2 | 12/2008 | Kjorling et al. | |
| 7,864,843 | B2 | 1/2011 | Choo et al. | |
| 8,600,737 | B2 | 12/2013 | Yang et al. | |
| 2003/0088423 | A1 | 5/2003 | Nishio et al. | |
| 2005/0004793 | A1 | 1/2005 | Ojala et al. | |
| 2005/0261897 | A1 | 11/2005 | Jelinek | |
| 2006/0271354 | A1 | 11/2006 | Sun et al. | |
| 2006/0271356 | A1 | 11/2006 | Vos et al. | |
| 2007/0225971 | A1 | 9/2007 | Bessette | |
| 2008/0027711 | A1 | 1/2008 | Rajendran et al. | |
| 2008/0027718 | A1 | 1/2008 | Krishnan et al. | |
| 2008/0046252 | A1 * | 2/2008 | Zopf | G10L 19/0204 704/E19.003 |
| 2008/0219344 | A1 | 9/2008 | Suzuki et al. | |
| 2009/0210234 | A1 | 8/2009 | Sung et al. | |
| 2009/0232228 | A1 | 9/2009 | Thyssen | |
| 2009/0265167 | A1 | 10/2009 | Ehara et al. | |
| 2009/0319277 | A1 | 12/2009 | Black | |
| 2010/0088091 | A1 | 4/2010 | Lee et al. | |
| 2010/0332223 | A1 | 12/2010 | Morii et al. | |
| 2011/0257984 | A1 | 10/2011 | Virette et al. | |
| 2011/0295598 | A1 | 12/2011 | Yang et al. | |
| 2012/0010879 | A1 | 1/2012 | Tsujino et al. | |
| 2012/0010882 | A1 | 1/2012 | Thyssen et al. | |
| 2012/0230515 | A1 | 9/2012 | Grancharov | |

FOREIGN PATENT DOCUMENTS

| | | | |
|---|---|---|---|
| CN | 101185124 | A | 5/2008 |
| CN | 101261834 | A | 9/2008 |
| EP | 2051245 | A | 4/2009 |
| JP | H08160996 | A1 | 6/1996 |
| JP | 2008535024 | A1 | 8/2008 |
| JP | 2009545775 | A1 | 12/2009 |
| KR | 20070118173 | A1 | 12/2007 |
| WO | 9819298 | A1 | 5/1998 |
| WO | 2006107840 | A1 | 10/2006 |
| WO | 2006116025 | A1 | 11/2006 |
| WO | 2013066238 | A2 | 5/2013 |

OTHER PUBLICATIONS

Gottesman, et al., "Enhanced Analysis-By-Synthesis Waveform Interpolative Coding at 4 KBPS," Eurospeech '99, 1999, 4 pages.
Chen, J., et al., "Adaptive Postfiltering for Quality Enhancement of Coded Speech," XP055104008, IEEE Transactions on Speech and Audio Processing, vol. 3, No. 1, Jan. 1995, pp. 59-71.
Zhan, J., et al., "Bandwidth Extension for China AVS-M Standard," 2009 IEEE International Conference on Acoustics, Speech and Signal Processing, U.S., IEEE, Apr. 24, 2009, pp. 4149-4152.
Fuchs, G., et al. "A New Post-filtering for Artificially Replicated High-Band in Speech Coders," ICASSP 2006, pp. 713-716.
Qian, Y., et al., "Combining Equalization and Estimation for Bandwidth Extension of Narrowband Speech," IEEE International Conference on Acoustics, Speech, and Signal Processing, 2004, pp. 713-716.

* cited by examiner

ENCODING METHOD, DECODING METHOD, ENCODING APPARATUS, AND DECODING APPARATUS

CROSS-REFERENCE TO RELATED APPLICATION

This is a continuation of U.S. patent application Ser. No. 16/999,448 filed on Aug. 21, 2020, which is a continuation of U.S. patent application Ser. No. 16/238,797 filed on Jan. 3, 2019, now U.S. Pat. No. 10,770,085, which is a continuation of U.S. patent application Ser. No. 15/677,324 filed on Aug. 15, 2017, now U.S. Pat. No. 10,210,880, which is a continuation of U.S. patent application Ser. No. 14/721,606 filed on May 26, 2015, now U.S. Pat. No. 9,761,235, which is a continuation of International Patent Application No. PCT/CN2013/080061 filed on Jul. 25, 2013, which claims priority to Chinese Patent Application No. 201310014342.4 filed on Jan. 15, 2013. All of the aforementioned patent applications are hereby incorporated by reference in their entireties.

TECHNICAL FIELD

Embodiments of the present application relate to the field of communications technologies, and in particular, to an encoding method, a decoding method, an encoding apparatus, a decoding apparatus, a transmitter, a receiver, and a communications system.

BACKGROUND

With continuous progress of communications technologies, users are imposing an increasingly high requirement on voice quality. Generally, voice quality is improved by increasing bandwidth of the voice quality. If a signal whose bandwidth is wider is encoded in a traditional encoding manner, a bit rate is greatly improved and as a result, it is difficult to implement encoding because of a limitation condition of current network bandwidth. Therefore, encoding needs to be performed on a signal whose bandwidth is wider in a case in which a bit rate is unchanged or slightly changed, and a solution proposed for this issue is to use a bandwidth extension technology. The bandwidth extension technology may be completed in a time domain or a frequency domain. A basic principle of performing bandwidth extension in a time domain is that two different processing methods are used for a low band signal and a high band signal.

In the foregoing technology of performing bandwidth extension in a time domain, the high band signal is restored in a condition of a specific rate, however, a performance indicator is deficient. It may be learned by comparing a frequency spectrum of a voice signal that is restored by decoding and a frequency spectrum of an original voice signal that, a restored voice signal sounds rustling and a sound is not clear enough.

SUMMARY

Embodiments of the present application provide an encoding method, a decoding method, an encoding apparatus, a decoding apparatus, a transmitter, a receiver, and a communications system, which can improve articulation of a restored signal, thereby enhancing encoding and decoding performance.

According to a first aspect, an encoding method is provided, including dividing a to-be-encoded time-domain signal into a low band signal and a high band signal, performing encoding on the low band signal to obtain a low frequency encoding parameter, performing encoding on the high band signal to obtain a high frequency encoding parameter, obtaining a synthesized high band signal according to the low frequency encoding parameter and the high frequency encoding parameter, performing short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of the high band signal, and calculating a high frequency gain based on the high band signal and the short-time filtering signal.

With reference to the first aspect, in an implementation manner of the first aspect, performing short-time post-filtering processing on the synthesized high band signal includes setting a coefficient of a pole-zero post-filter based on the high frequency encoding parameter, and performing filtering processing on the synthesized high band signal using the pole-zero post-filter.

With reference to the first aspect and the foregoing implementation manner, in another implementation manner of the first aspect, the performing short-time post-filtering processing on the synthesized high band signal may further include, after performing filtering processing on the synthesized high band signal using the pole-zero post-filter, performing, using a first-order filter whose z-domain transfer function is $H_t(z)=1-\mu z^{-1}$, filtering processing on the synthesized high band signal that has been processed by the pole-zero post-filter, where μ is a preset constant or a value obtained by adaptive calculation that is performed according to the high frequency encoding parameter and the synthesized high band signal.

With reference to the first aspect and the foregoing implementation manners, in another implementation manner of the first aspect, the performing encoding on the high band signal to obtain a high frequency encoding parameter includes performing, using a linear predictive coding (LPC) technology, encoding on the high band signal to obtain an LPC coefficient and use the LPC coefficient as the high frequency encoding parameter, where a z-domain transfer function of the pole-zero post-filter is a formula as follows:

$$H_s(z) = \frac{1 - a_1\beta z^{-1} - a_2\beta^2 z^{-2} - \ldots - a_M\beta^M z^{-M}}{1 - a_1\gamma z^{-1} - a_2\gamma^2 z^{-2} - \ldots - a_M\gamma^M z^{-M}},$$

where $\alpha_1$、$\alpha_2$、 ... $\alpha_M$ is the LPC coefficient, M is an order of the LPC coefficient, and β and γ are preset constants and satisfy 0<β<β<1.

With reference to the first aspect and the foregoing implementation manners, in another implementation manner of the first aspect, the encoding method may further include generating an encoding bitstream according to the low frequency encoding parameter, the high frequency encoding parameter, and the high frequency gain.

According to a second aspect, a decoding method is provided, including differentiating a low frequency encoding parameter, a high frequency encoding parameter, and a high frequency gain from encoded information, performing decoding on the low frequency encoding parameter to obtain a low band signal, obtaining a synthesized high band signal according to the low frequency encoding parameter and the high frequency encoding parameter, performing short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of a high band signal, adjusting the short-time filtering signal using the high frequency gain to obtain a high band signal, and combining the low band signal and the high band signal to obtain a final decoding signal.

With reference to the second aspect, in an implementation manner of the second aspect, the performing short-time post-filtering processing on the synthesized high band signal includes setting a coefficient of a pole-zero post-filter based on the high frequency encoding parameter, and performing filtering processing on the synthesized high band signal using the pole-zero post-filter.

With reference to the second aspect and the foregoing implementation manner, in another implementation manner of the second aspect, performing short-time post-filtering processing on the synthesized high band signal may further include, after performing filtering processing on the synthesized high band signal using the pole-zero post-filter, performing, using a first-order filter whose z-domain transfer function is $H_t(z)=1-\mu z^{-1}$, filtering processing on the synthesized high band signal that has been processed by the pole-zero post-filter, where μ is a preset constant or a value obtained by adaptive calculation that is performed according to the high frequency encoding parameter and the synthesized high band signal.

With reference to the second aspect and the foregoing implementation manners, in another implementation manner of the second aspect, the high frequency encoding parameter may include an LPC coefficient that is obtained by performing encoding using an LPC technology, and a z-domain transfer function of the pole-zero post-filter is a formula as follows:

$$H_s(z) = \frac{1 - a_1\beta z^{-1} - a_2\beta^2 z^{-2} - \dots - a_M\beta^M z^{-M}}{1 - a_1\gamma z^{-1} - a_2\gamma^2 z^{-2} - \dots - a_M\gamma^M z^{-M}},$$

where $\alpha_1$、$\alpha_2$、 . . . $\alpha_M$ is the LPC coefficient, M is an order of the LPC coefficient, and β and γ are preset constants and satisfy $0<\beta<\gamma<1$.

According to a third aspect, an encoding apparatus is provided, including a division unit configured to divide a to-be-encoded time-domain signal into a low band signal and a high band signal, a low frequency encoding unit configured to perform encoding on the low band signal to obtain a low frequency encoding parameter, a high frequency encoding unit configured to perform encoding on the high band signal to obtain a high frequency encoding parameter, a synthesizing unit configured to obtain a synthesized high band signal according to the low frequency encoding parameter and the high frequency encoding parameter, a filtering unit configured to perform short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of the high band signal, and a calculation unit configured to calculate a high frequency gain based on the high band signal and the short-time filtering signal.

With reference to the third aspect, in an implementation manner of the third aspect, the filtering unit may include a pole-zero post-filter configured to perform filtering processing on the synthesized high band signal, where a coefficient of the pole-zero post-filter may be set based on the high frequency encoding parameter.

With reference to the third aspect and the foregoing implementation manner, in another implementation manner of the third aspect, the filtering unit may further include a first-order filter, which is located behind the pole-zero post-filter and whose z-domain transfer function is $H_t(z)=1-\mu z^{-1}$ configured to perform filtering processing on the synthesized high band signal that has been processed by the pole-zero post-filter, where μ is a preset constant or a value obtained by adaptive calculation that is performed according to the high frequency encoding parameter and the synthesized high band signal.

With reference to the third aspect and the foregoing implementation manners, in another implementation manner of the third aspect, the high frequency encoding unit may perform encoding on the high band signal using an LPC technology to obtain an LPC coefficient and use the LPC coefficient as the high frequency encoding parameter, and a z-domain transfer function of the pole-zero post-filter is a formula as follows:

$$H_s(z) = \frac{1 - a_1\beta z^{-1} - a_2\beta^2 z^{-2} - \dots - a_M\beta^M z^{-M}}{1 - a_1\gamma z^{-1} - a_2\gamma^2 z^{-2} - \dots - a_M\gamma^M z^{-M}},$$

where $\alpha_1$、$\alpha_2$、 . . . $\alpha_M$ is the LPC coefficient, M is an order of the LPC coefficient, and β and γ are preset constants and satisfy $0<\beta<\gamma<1$.

With reference to the third aspect and the foregoing implementation manners, in another implementation manner of the third aspect, the encoding apparatus may further include a bitstream generating unit configured to generate an encoding bitstream according to the low frequency encoding parameter, the high frequency encoding parameter, and the high frequency gain.

According to a fourth aspect, a decoding apparatus is provided, including a differentiating unit configured to differentiate a low frequency encoding parameter, a high frequency encoding parameter, and a high frequency gain from encoded information, a low frequency decoding unit configured to perform decoding on the low frequency encoding parameter to obtain a low band signal, a synthesizing unit configured to obtain a synthesized high band signal according to the low frequency encoding parameter and the high frequency encoding parameter, a filtering unit configured to perform short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of a high band signal, a high frequency decoding unit configured to adjust the short-time filtering signal using the high frequency gain to obtain a high band signal, and a combining unit configured to combine the low band signal and the high band signal to obtain a final decoding signal.

With reference to the fourth aspect, in an implementation manner of the fourth aspect, the filtering unit may include a pole-zero post-filter configured to perform filtering processing on the synthesized high band signal, where a coefficient of the pole-zero post-filter may be set based on the high frequency encoding parameter.

With reference to the fourth aspect and the foregoing implementation manner, in another implementation manner of the fourth aspect, the filtering unit may further include a first-order filter, which is located behind the pole-zero post-filter and whose z-domain transfer function is $H_t(z)=1-\mu z^{-1}$ configured to perform filtering processing on the synthesized high band signal that has been processed by the pole-zero post-filter, where $\mu$ is a preset constant or a value obtained by adaptive calculation that is performed according to the high frequency encoding parameter and the synthesized high band signal.

With reference to the fourth aspect and the foregoing implementation manners, in another implementation manner of the fourth aspect, the high frequency encoding parameter may include an LPC coefficient that is obtained using an LPC technology, and a z-domain transfer function of the pole-zero post-filter is a formula as follows:

$$H_s(z) = \frac{1 - a_1\beta z^{-1} - a_2\beta^2 z^{-2} - \ldots - a_M\beta^M z^{-M}}{1 - a_1\gamma z^{-1} - a_2\gamma^2 z^{-2} - \ldots - a_M\gamma^M z^{-M}},$$

where $\alpha_1$、$\alpha_2$、$\ldots\alpha_M$ is the LPC coefficient, M is an order of the LPC coefficient, and $\beta$ and $\gamma$ are preset constants and satisfy $0<\beta<\beta<1$.

According to a fifth aspect, a transmitter is provided, including an encoding apparatus according to the third aspect, and a transmit unit configured to allocate bits to a high frequency encoding parameter and a low frequency encoding parameter that are generated by the encoding apparatus so as to generate a bit stream, and transmit the bit stream.

According to a sixth aspect, a receiver is provided, including a receive unit configured to receive a bit stream and extract encoded information from the bit stream, and a decoding apparatus according to the fourth aspect.

According to a seventh aspect, a communications system is provided, including a transmitter according to the fifth aspect or a receiver according to the sixth aspect.

In the foregoing technical solution according to the embodiments of the present application, when a high frequency gain is calculated based on a synthesized high band signal in an encoding and decoding process, short-time post-filtering processing is performed on the synthesized high band signal to obtain a short-time filtering signal, and the high frequency gain is calculated based on the short-time filtering signal, which can reduce or even remove a rustle from a restored signal, and improve an encoding and decoding effect.

BRIEF DESCRIPTION OF DRAWINGS

To describe the technical solutions in some of the embodiments of the present application more clearly, the following briefly introduces the accompanying drawings describing some of the embodiments. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are some but not all of the embodiments of the present application.

The technical solutions of the present application may be applied to various communications systems, such as Global System for Mobile Communication (GSM), Code Division Multiple Access (CDMA), Wideband CDMA (WCDMA), General Packet Radio Service (GPRS), and Long-Term Evolution (LTE).

A bandwidth extension technology may be completed in a time domain or a frequency domain, and in an embodiment of the present application, bandwidth extension is completed in a time domain.

Figure 1:
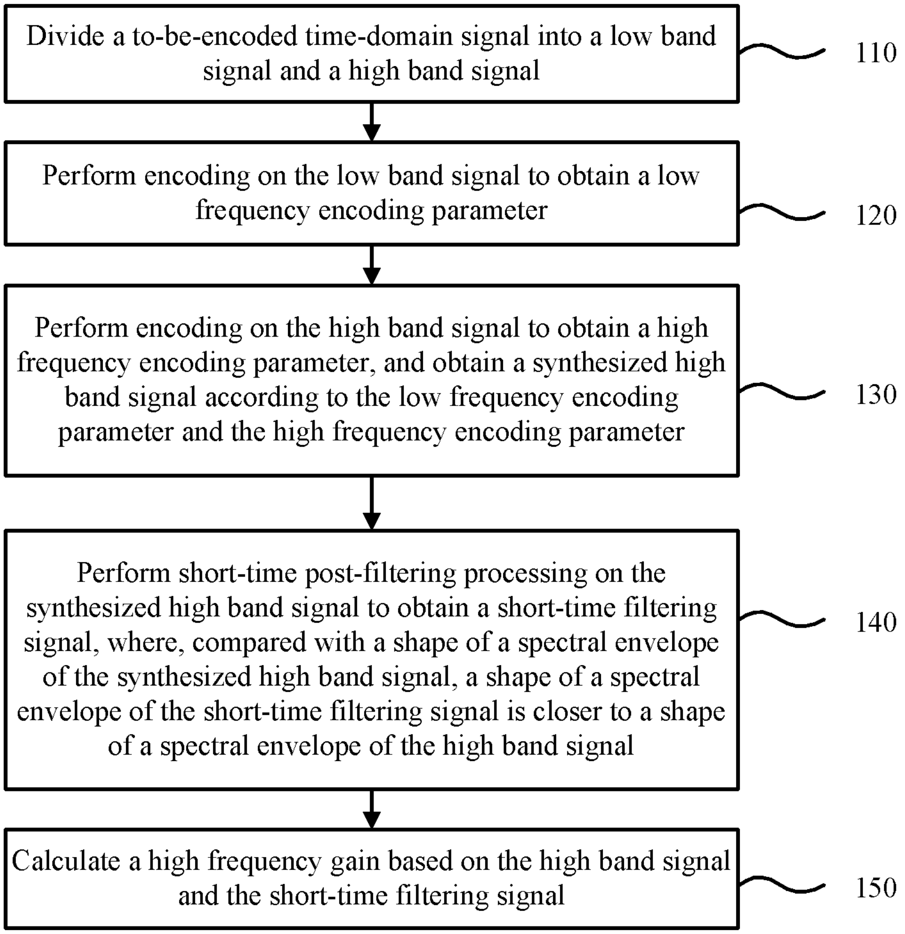
FIG. 1 is a flowchart that schematically shows an encoding method according to an embodiment of the present application.

FIG. 1 is a flowchart that shows an encoding method according to an embodiment of the present application. The encoding method includes the following steps.

Step 110. Divide a to-be-encoded time-domain signal into a low band signal and a high band signal.

Step 120. Perform encoding on the low band signal to obtain a low frequency encoding parameter.

Step 130. Perform encoding on the high band signal to obtain a high frequency encoding parameter, and obtaining a synthesized high band signal according to the low frequency encoding parameter and the high frequency encoding parameter.

Step 140. Perform short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of the high band signal.

Step 150. Calculate a high frequency gain based on the high band signal and the short-time filtering signal.

In step 110, the to-be-encoded time-domain signal is divided into the low band signal and the high band signal. This division is to divide the time-domain signal into two signals for processing such that the low band signal and the high band signal can be separately processed. The division may be implemented using any conventional or future division technology. The meaning of the low frequency herein is relative to the meaning of the high frequency. For example, a frequency threshold may be set, where a frequency lower than the frequency threshold is a low frequency, and a frequency higher than the frequency threshold is a high frequency. In practice, the frequency threshold may be set according to a requirement, and a low band signal component and a high frequency component in a signal may also be differentiated using another manner in order to implement the division.

In step 120, the low band signal is encoded to obtain the low frequency encoding parameter. By the encoding, the low band signal is processed so as to obtain the low frequency encoding parameter such that a decoder side restores the low band signal according to the low frequency encoding parameter. The low frequency encoding parameter is a parameter required by the decoder side to restore the low band signal. As an example, encoding may be performed using an encoder (e.g., Algebraic Code Excited Linear Prediction (ACELP) encoder) that uses an ACELP algorithm, and a low frequency encoding parameter obtained in this case may include, for example, an algebraic codebook, an algebraic codebook gain, an adaptive codebook, an adaptive codebook gain, and a pitch period, and may also include another parameter. The low frequency encoding parameter may be transferred to the decoder side to restore the low band signal. In addition, when the algebraic codebook and the adaptive codebook are transferred from an encoder side to the decoder side, only an algebraic codebook index and an adaptive codebook index may be transferred, and the decoder side obtains a corresponding algebraic codebook and adaptive codebook according to the algebraic codebook index and the adaptive codebook index in order to implement the restoration. In practice, the low band signal may be encoded using a proper encoding technology according to a requirement. When an encoding technology changes, composition of the low frequency encoding parameter may also change.

In this embodiment of the present application, an encoding technology that uses the ACELP algorithm is used as an example for description.

In step 130, the high band signal is encoded to obtain the high frequency encoding parameter, and the synthesized high band signal is obtained according to the low frequency encoding parameter and the high frequency encoding parameter. For example, LPC analysis may be performed on a high band signal in an original signal to obtain a high frequency encoding parameter such as an LPC coefficient, the low frequency encoding parameter is used to predict a high frequency excitation signal, and the high frequency excitation signal is used to obtain the synthesized high band signal using a synthesis filter that is determined according to the LPC coefficient. In practice, another technology may be adopted according to a requirement so as to obtain the synthesized high band signal according to the low frequency encoding parameter and the high frequency encoding parameter.

In step 140, the short-time post-filtering processing is performed on the synthesized high band signal to obtain the short-time filtering signal, where, compared with the shape of the spectral envelope of the synthesized high band signal, the shape of the spectral envelope of the short-time filtering signal is closer to the shape of the spectral envelope of the high band signal.

For example, a filter that is used to perform post-filtering processing on the synthesized high band signal may be formed based on the high frequency encoding parameter, and the filter is used to perform filtering on the synthesized high band signal to obtain the short-time filtering signal, where, compared with the shape of the spectral envelope of the synthesized high band signal, the shape of the spectral envelope of the short-time filtering signal is closer to the shape of the spectral envelope of the high band signal. For example, a coefficient of a pole-zero post-filter may be set based on the high frequency encoding parameter, and the pole-zero post-filter may be used to perform filtering processing on the synthesized high band signal. Alternatively, a coefficient of an all-pole post-filter may be set based on the high frequency encoding parameter, and the all-pole post-filter may be used to perform filtering processing on the synthesized high band signal. That encoding is performed on the high band signal using an LPC technology and is used as an example for the description below.

In a case in which encoding is performed on the high band signal using the LPC technology, the high frequency encoding parameter includes an LPC coefficient $\alpha_1$、$\alpha_2$、. . . $\alpha_M$ is an order of the LPC coefficient, and a pole-zero post-filter whose coefficient transfer function is calculated in the following formula (1) may be set based on the LPC coefficient:

$$H_s(z) = \frac{1 - a_1\beta z^{-1} - a_2\beta^2 z^{-2} - \ldots - a_M\beta^M z^{-M}}{1 - a_1\gamma z^{-1} - a_2\gamma^2 z^{-2} - \ldots - a_M\gamma^M z^{-M}}, \quad \text{formula (1)}$$

where $\beta$ and $\gamma$ are preset constants and satisfy $0<\beta<\gamma<1$. In an embodiment, it may be made that $\beta=0.5$, $\gamma=0.8$. A shape of a spectral envelope of a synthesized high band signal that has been processed by the pole-zero post-filter whose transfer function is shown in formula (1) is closer to the shape of the spectral envelope of the high band signal in order to avoid a rustle in the restored signal and improve an encoding effect. The transfer function shown in formula (1) is a z-domain transfer function, but this transfer function may further be a transfer function in another domain such as a time domain or a frequency domain. In addition, the synthesized high band signal after the pole-zero post-filtering processing has a low-pass effect, therefore, after the filtering processing is performed on the synthesized high band signal using the pole-zero post-filter, processing may further be performed using a first-order filter whose z-domain transfer function is calculated in the following formula (2):

$$H_t(z)=1-\mu z^{-1}, \quad (2)$$

where $\mu$ is a preset constant or a value obtained by adaptive calculation that is performed according to the high frequency encoding parameter and the synthesized high band signal. For example, in a case in which encoding is performed on the high band signal using the LPC technology, $\mu$ may be obtained by calculation using the LPC coefficient, $\beta$ and $\gamma$, and the synthesized high band signal as a function, and a person skilled in the art may use various existing methods to perform the calculation, and details are not described herein again. Compared with a short-time filtering signal that is obtained from filtering processing only by the pole-zero post-filter, a change of a spectral envelope of a short-time filtering signal that is obtained from filtering processing by both the pole-zero post-filter and the first-order filter is closer to a change of the spectral envelope of the original high band signal, and an encoding effect can be further improved.

In a case in which encoding is performed on the high band signal using the LPC technology, if the short-time post-filtering processing is implemented using the all-pole post-filter, a z-domain transfer function of the all-pole post-filter whose coefficient is set based on the high frequency encoding parameter may be shown in the following formula (3):

$$H_s(z) = \frac{1}{1 - a_1\gamma z^{-1} - a_2\gamma^2 z^{-2} - \ldots - a_M\gamma^M z^{-M}}, \quad \text{formula (3)}$$

where β and γ are preset constants and satisfy $0<\beta<\gamma<1$, $\alpha_1$ 、 $\alpha_2$ 、 . . . $\alpha_M$ is used as an LPC coefficient of the high frequency encoding parameter, and M is an order of the LPC coefficient.

In step 150, the high frequency gain is calculated based on the high band signal and the short-time filtering signal. The high frequency gain is used to indicate an energy difference between the original high band signal and the short-time filtering signal (that is, a synthesized high band signal after short-time post-filtering processing). When signal decoding is performed, after the synthesized high band signal is obtained, the high frequency gain can be used to restore a high band signal.

After the high frequency gain, the high frequency encoding parameter, and the low frequency encoding parameter are obtained, an encoding bitstream is generated according to the low frequency encoding parameter, the high frequency encoding parameter, and the high frequency gain, thereby implementing encoding. In the foregoing encoding method according to this embodiment of the present application, short-time post-filtering processing is performed on a synthesized high band signal to obtain a short-time filtering signal, and a high frequency gain is calculated based on the short-time filtering signal, which can reduce or even remove a rustle from a restored signal, and improve an encoding effect.

Figure 2:
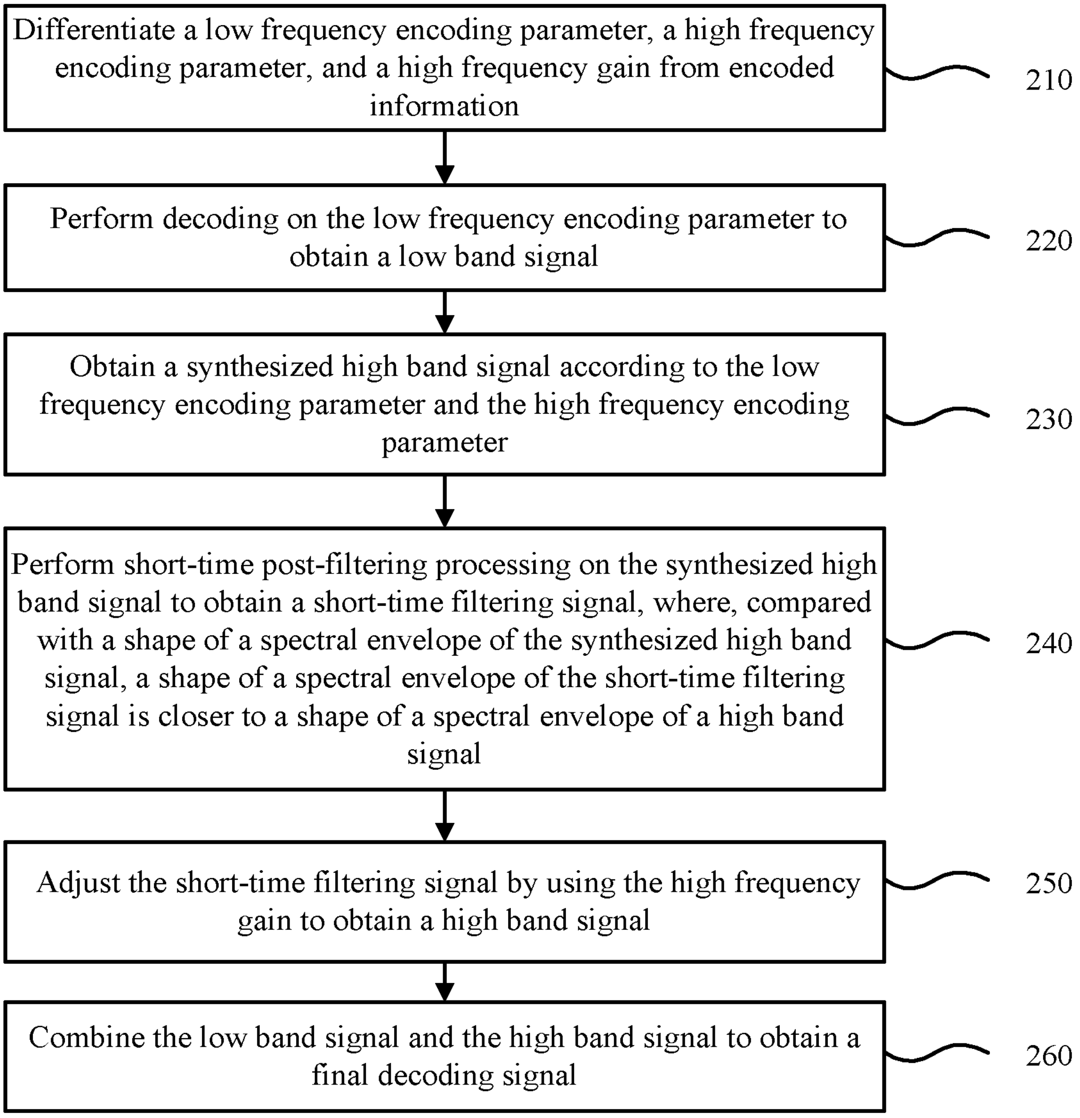
FIG. 2 is a flowchart that schematically shows a decoding method according to an embodiment of the present application.

FIG. 2 is a flowchart that schematically shows a decoding method according to an embodiment of the present application. The decoding method includes the following steps.

Step 210. Differentiate a low frequency encoding parameter, a high frequency encoding parameter, and a high frequency gain from encoded information.

Step 220. Perform decoding on the low frequency encoding parameter to obtain a low band signal.

Step 230. Obtain a synthesized high band signal according to the low frequency encoding parameter and the high frequency encoding parameter.

Step 240. Perform short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of a high band signal.

Step 250. Adjust the short-time filtering signal using the high frequency gain to obtain a high band signal.

Step 260. Combine the low band signal and the high band signal to obtain a final decoding signal.

In step 210, the low frequency encoding parameter, the high frequency encoding parameter, and the high frequency gain are differentiated from the encoded information. The low frequency encoding parameter may include, for example, an algebraic codebook, an algebraic codebook gain, an adaptive codebook, an adaptive codebook gain, a pitch period, and another parameter, and the high frequency encoding parameter may include, for example, an LPC coefficient and another parameter. In addition, the low frequency encoding parameter and the high frequency encoding parameter may alternatively include another parameter according to a different encoding technology.

In step 220, decoding is performed on the low frequency encoding parameter to obtain the low band signal. A decoding manner corresponds to an encoding manner of an encoder side. For example, when an ACELP encoder that uses an ACELP algorithm is used at the encoder side to perform encoding, in 220, an ACELP decoder is used to obtain the low band signal.

In step 230, the synthesized high band signal is obtained according to the low frequency encoding parameter and the high frequency encoding parameter. For example, the low frequency encoding parameter is used to restore a high frequency excitation signal, the LPC coefficient in the high frequency encoding parameter is used to generate a synthesized filter, and the synthesized filter is used to perform filtering on the high frequency excitation signal to obtain the synthesized high band signal. In practice, another technology may further be adopted according to a requirement so as to obtain the synthesized high band signal based on the low frequency encoding parameter and the high frequency encoding parameter.

As described above, in a process of obtaining the synthesized high band signal according to the low frequency encoding parameter and the high frequency encoding parameter, a frequency spectrum of the high frequency excitation signal that is obtained using the low frequency encoding parameter to perform a prediction is flat, however, a frequency spectrum of an actual high frequency excitation signal is not flat. This difference causes that the spectral envelope of the synthesized high band signal does not change with a spectral envelope of the high band signal in an original signal, and further causes a rustle in a restored voice signal.

In step 240, the short-time post-filtering processing is performed on the synthesized high band signal to obtain the short-time filtering signal, where, compared with the shape of the spectral envelope of the synthesized high band signal, the shape of the spectral envelope of the short-time filtering signal is closer to the shape of the spectral envelope of the high band signal.

For example, a filter that is used to perform post-filtering processing on the synthesized high band signal may be formed based on the high frequency encoding parameter, and the filter is used to perform filtering on the synthesized high band signal to obtain a short-time filtering signal, where, compared with the synthesized high band signal, the shape of the spectral envelope of the short-time filtering signal is closer to the shape of the spectral envelope of the high band signal. For example, a coefficient of a pole-zero post-filter may be set based on the high frequency encoding parameter, and the pole-zero post-filter may be used to perform filtering processing on the synthesized high band signal. Alternatively, a coefficient of an all-pole post-filter may be set based on the high frequency encoding parameter, and the all-pole post-filter may be used to perform filtering processing on the synthesized high band signal.

In a case in which encoding is performed on the high band signal using an LPC technology, the high frequency encoding parameter includes an LPC coefficient $\alpha_1$ 、 $\alpha_2$ 、 . . . $\alpha_M$, M is an order of the LPC coefficient, a z-domain transfer function of a pole-zero post-filter that is set based on the LPC coefficient may be the foregoing formula (1), and a z-domain transfer function of an all-pole post-filter that is set based on the LPC coefficient may be the foregoing formula (3). Compared with a shape of a spectral envelope of a synthesized high band signal that has not been processed by the pole-zero post-filter (or the all-pole post-filter), a shape of a spectral envelope of a synthesized high band signal that has been processed by the pole-zero post-filter (or the all-pole post-filter) is closer to a shape of a spectral envelope of an original high band signal, which avoids a rustle in a restored signal, thereby improving an encoding effect.

In addition, as described above, the synthesized high band signal after the pole-zero post-filtering processing shown in formula (1) has a low-pass effect, therefore, after the filtering processing is performed on the synthesized high band signal using the pole-zero post-filter, processing may further be performed using a first-order filter whose z-domain transfer function is the foregoing formula (2) in order to further improve the encoding effect.

For a description of step 240, reference may be made to the foregoing description that is of step 140 and is performed with reference to FIG. 1.

In step 250, the high frequency gain is used to adjust the short-time filtering signal to obtain the high band signal. Corresponding to that, at the decoder side, the high frequency gain is obtained using the high band signal and the short-time filtering signal (step 150 in FIG. 1), in step 250, the high frequency gain is used to adjust the short-time filtering signal to restore the high band signal.

In step 260, the low band signal and the high band signal are combined to obtain the final decoding signal. This combination manner corresponds to a dividing manner in step 110 of FIG. 1, thereby implementing decoding to obtain a final output signal.

In the foregoing decoding method according to this embodiment of the present application, short-time post-filtering processing is performed on a synthesized high band signal to obtain a short-time filtering signal, and a high frequency gain is calculated based on the short-time filtering signal, which can reduce or even remove a rustle from a restored signal, and improve a decoding effect.

Figure 3:
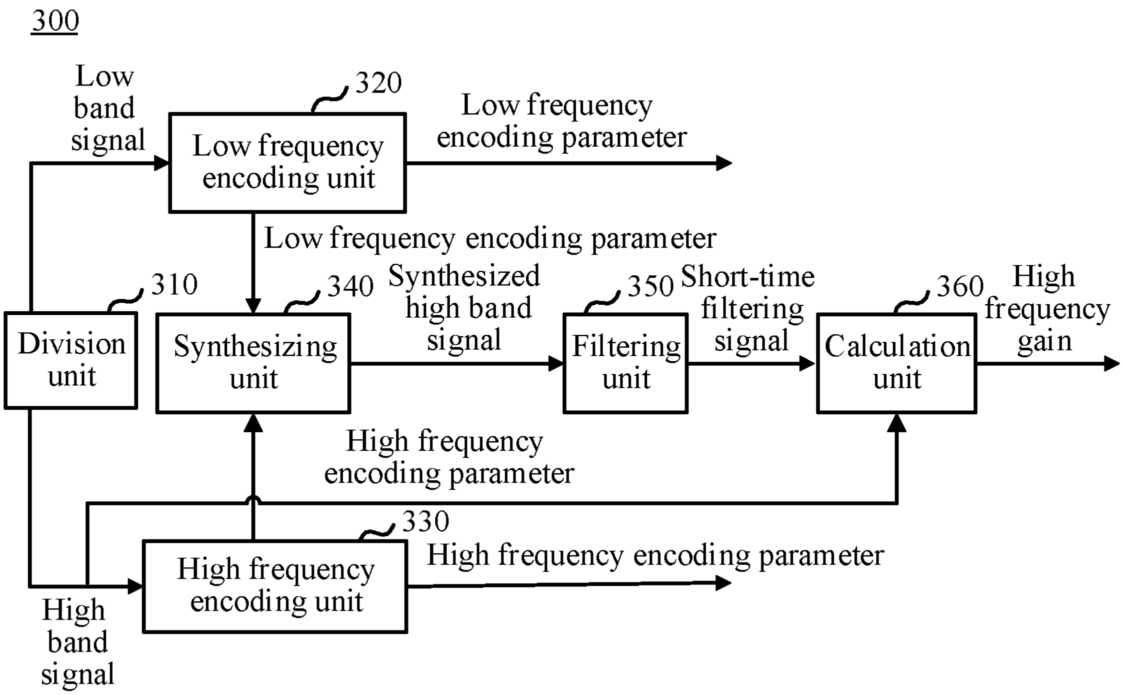
FIG. 3 is a block diagram that schematically shows an encoding apparatus according to an embodiment of the present application.

FIG. 3 is a block diagram that schematically shows an encoding apparatus 300 according to an embodiment of the present application. The encoding apparatus 300 includes a division unit 310 configured to divide a to-be-encoded time-domain signal into a low band signal and a high band signal, a low frequency encoding unit 320 configured to perform encoding on the low band signal to obtain a low frequency encoding parameter, a high frequency encoding unit 330 configured to perform encoding on the high band signal to obtain a high frequency encoding parameter, a synthesizing unit 340 configured to obtain a synthesized high band signal according to the low frequency encoding parameter and the high frequency encoding parameter, a filtering unit 350 configured to perform short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of the high band signal, and a calculation unit 360 configured to calculate a high frequency gain based on the high band signal and the short-time filtering signal.

After receiving an input time-domain signal, the division unit 310 divides the to-be-encoded time-domain signal into two signals (a low band signal and a high band signal) to perform processing. The division may be implemented using any conventional or future division technology. The meaning of the low frequency herein is relative to the meaning of the high frequency. For example, a frequency threshold may be set, where a frequency lower than the frequency threshold is a low frequency, and a frequency higher than the frequency threshold is a high frequency. In practice, the frequency threshold may be set according to a requirement, and a low band signal component and a high frequency component in a signal may also be differentiated using another manner in order to implement the division.

The low frequency encoding unit 320 may use a proper encoding technology according to a requirement so as to perform encoding on the low band signal. For example, the low frequency encoding unit 320 may use an ACELP encoder to perform encoding so as to obtain the low frequency encoding parameter (which may include, for example, an algebraic codebook, an algebraic codebook gain, an adaptive codebook, an adaptive codebook gain, and a pitch period). When a used encoding technology changes, composition of the low frequency encoding parameter may also change. The obtained low frequency encoding parameter is a parameter required for restoring the low band signal, and the obtained low frequency encoding parameter is transferred to a decoder to restore the low band signal.

The high frequency encoding unit 330 performs encoding on the high band signal to obtain a high frequency encoding parameter. For example, the high frequency encoding unit 330 may perform LPC analysis on a high band signal in an original signal to obtain a high frequency encoding parameter such as an LPC coefficient. An encoding technology that is used to perform encoding on the high band signal constitutes no limitation on the embodiments of the present application.

The synthesizing unit 340 uses the low frequency encoding parameter to predict a high frequency excitation signal, and enables the high frequency excitation signal to pass to a synthesized filter that is determined according to the LPC coefficient so as to obtain the synthesized high band signal. In practice, another technology may further be adopted according to a requirement so as to obtain the synthesized high band signal according to the low frequency encoding parameter and the high frequency encoding parameter. A frequency spectrum of the high frequency excitation signal that is obtained by the synthesizing unit 340 by performing a prediction using the low frequency encoding parameter is flat, however, a frequency spectrum of an actual high frequency excitation signal is not flat. This difference causes that the spectral envelope of the synthesized high band signal does not change with the spectral envelope of the high band signal in the original signal, and further causes a rustle in a restored voice signal.

The filtering unit 350 is configured to perform short-time post-filtering processing on the synthesized high band signal to obtain the short-time filtering signal, where, compared with the shape of the spectral envelope of the synthesized high band signal, the shape of the spectral envelope of the short-time filtering signal is closer to the shape of the spectral envelope of the high band signal. The following describes the filtering unit 350 with reference to FIG. 4.

Figure 4:
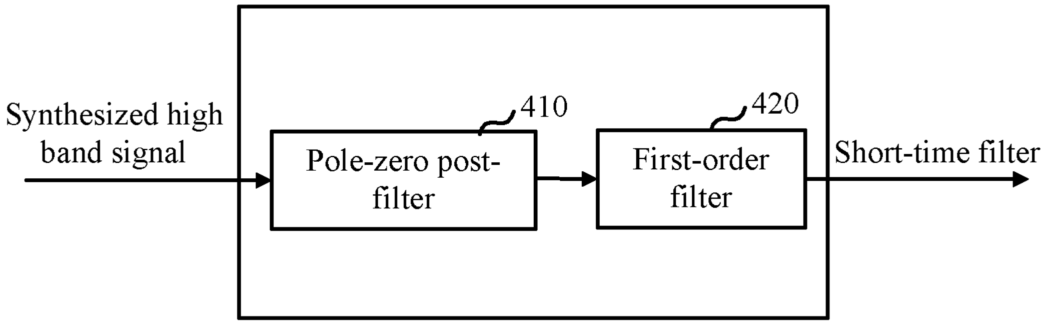
FIG. 4 is a block diagram that schematically shows a filtering unit in an encoding apparatus according to an embodiment of the present application.

FIG. 4 is a block diagram that schematically shows the filtering unit 350 in the encoding apparatus 300 according to an embodiment of the present application.

The filtering unit 350 may include a pole-zero post-filter 410, which is configured to perform filtering processing on the synthesized high band signal, where a coefficient of the pole-zero post-filter may be set based on the high frequency encoding parameter. In a case in which the high frequency encoding unit 330 performs encoding on the high band signal using an LPC technology, a z-domain transfer function of the pole-zero post-filter 410 may be shown in the foregoing formula (1). A shape of a spectral envelope of the synthesized high band signal that is processed by the pole-zero post-filter 410 is closer to the shape of the spectral envelope of the original high band signal, which avoids a rustle in a restored signal, thereby improving an encoding effect. Optionally, the filtering unit 350 may further include a first-order filter 420, which is located behind the pole-zero post-filter. A z-domain transfer function of the first-order filter 420 may be shown in the foregoing formula (2). Compared with a short-time filtering signal that is obtained from filtering processing by the pole-zero post-filter 410 only, a change of a spectral envelope of a short-time filtering signal that is obtained from filtering processing by both the pole-zero post-filter 410 and the first-order filter 420 is closer to a change of the spectral envelope of the original high band signal, and an encoding effect can be further improved.

As a replacement of the filtering unit 350 shown in FIG. 4, an all-pole post-filter may further be used to perform short-time post-filtering processing to obtain the short-time filtering signal, where, compared with the shape of the spectral envelope of the synthesized high band signal, the shape of the spectral envelope of the short-time filtering signal is closer to the shape of the spectral envelope of the high band signal. In a case in which encoding is performed on the high band signal using the LPC technology, a z-domain transfer function of the all-pole post-filter may be shown in the foregoing formula (3).

For description of the filtering unit 350, reference may be made to the foregoing description that is of step 140 and is performed with reference to FIG. 1.

The calculation unit 360 calculates the high frequency gain based on the high band signal that is provided by the division unit 310 and the short-time filtering signal that is output by the filtering unit 350. The high frequency gain and the low frequency encoding parameter and the high frequency encoding parameter together constitute encoding information, which is used for signal restoration at a decoder side.

In addition, the encoding apparatus 300 may further include a bitstream generating unit (not shown), where the bitstream generating unit is configured to generate an encoding bitstream according to the low frequency encoding parameter, the high frequency encoding parameter, and the high frequency gain. The decoder side that receives the encoding bitstream may perform decoding based on the low frequency encoding parameter, the high frequency encoding parameter, and the high frequency gain. For operations that are performed by units of the encoding apparatus shown in FIG. 3, reference may be made to the description that is of the encoding method and is performed with reference to FIG. 1.

In the foregoing encoding apparatus 300 according to this embodiment of the present application, short-time post-filtering processing is performed on a synthesized high band signal to obtain a short-time filtering signal, and a high frequency gain is calculated based on the short-time filtering signal, which can reduce or even remove a rustle from a restored signal, and improve an encoding effect.

Figure 5:
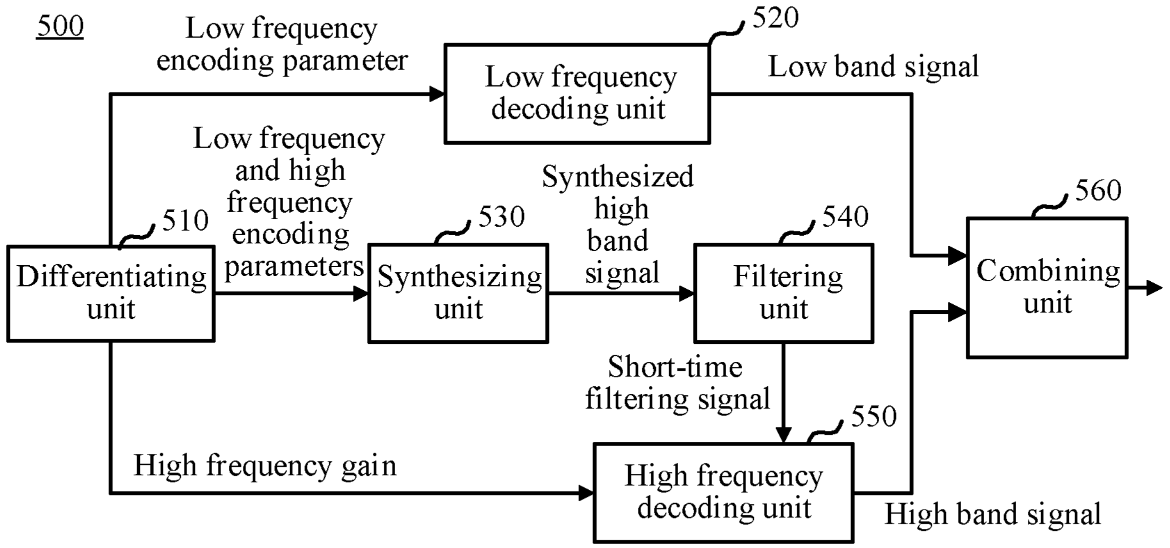
FIG. 5 is a block diagram that schematically shows a decoding apparatus according to an embodiment of the present application.

FIG. 5 is a block diagram that schematically shows a decoding apparatus 500 according to an embodiment of the present application. The decoding apparatus 500 includes a differentiating unit 510 configured to differentiate a low frequency encoding parameter, a high frequency encoding parameter, and a high frequency gain from encoded information, a low frequency decoding unit 520 configured to perform decoding on the low frequency encoding parameter to obtain a low band signal, a synthesizing unit 530 configured to obtain a synthesized high band signal according to the low frequency encoding parameter and the high frequency encoding parameter, a filtering unit 540 configured to perform short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of the high band signal, a high frequency decoding unit 550 configured to adjust the short-time filtering signal using the high frequency gain to obtain a high band signal, and a combining unit 560 configured to combine the low band signal and the high band signal to obtain a final decoding signal.

The differentiating unit 510 differentiates the low frequency encoding parameter, the high frequency encoding parameter, and the high frequency gain from encoded information. The low frequency encoding parameter may include, for example, an algebraic codebook, an algebraic codebook gain, an adaptive codebook, an adaptive codebook gain, a pitch period, and another parameter, and the high frequency encoding parameter may include, for example, an LPC coefficient and another parameter. In addition, the low frequency encoding parameter and the high frequency encoding parameter may alternatively include another parameter according to a different encoding technology.

The low frequency decoding unit 520 uses a decoding manner corresponding to an encoding manner of an encoder side, and performs decoding on the low frequency encoding parameter to obtain the low band signal. For example, when an ACELP encoder is used at the encoder side to perform encoding, the low frequency decoding unit 520 uses an ACELP decoder to obtain the low band signal.

That an LPC coefficient (that is, the high frequency encoding parameter) is obtained using LPC analysis is used as an example. The synthesizing unit 530 uses the low frequency encoding parameter to restore a high frequency excitation signal, uses the LPC coefficient to generate a synthesized filter, and uses the synthesized filter to perform filtering on the high frequency excitation signal to obtain the synthesized high band signal. In an embodiment, another technology may further be adopted according to a requirement so as to obtain the synthesized high band signal based on the low frequency encoding parameter and the high frequency encoding parameter.

A frequency spectrum of the high frequency excitation signal that is obtained by the synthesizing unit 530 by performing a prediction using the low frequency encoding parameter is flat. However, a frequency spectrum of an actual high frequency excitation signal is not flat. This difference causes that the spectral envelope of the synthesized high band signal does not change with the spectral envelope of the high band signal in an original signal, and further causes a rustle in a restored voice signal.

For example, a structure of the filtering unit 540 may be shown in FIG. 4. Alternatively, the filtering unit 540 may further use an all-pole post-filter to perform short-time post-filtering processing. In a case in which encoding is performed on the high band signal using an LPC technology, a z-domain transfer function of the all-pole post-filter may be shown in the foregoing formula (3). The filtering unit 540 is the same as the filtering unit 350 in FIG. 3, therefore, reference may be made to the foregoing description that is performed with reference to the filtering unit 350.

Corresponding to an operation, in an encoding apparatus 300, of calculating a high frequency gain based on a high band signal and a short-time filtering signal, the high frequency decoding unit 550 uses the high frequency gain to adjust the short-time filtering signal so as to obtain the high band signal.

In a combining manner corresponding to a dividing manner used by the division unit in the encoding apparatus 300, the combining unit 560 combines the low band signal and the high band signal, thereby implementing decoding and obtaining a final output signal.

In the foregoing decoding apparatus 500 according to this embodiment of the present application, short-time post-filtering processing is performed on a synthesized high band signal to obtain a short-time filtering signal, and a high frequency gain is calculated based on the short-time filtering signal, which can reduce or even remove a rustle from a restored signal, and improve a decoding effect.

Figure 6:
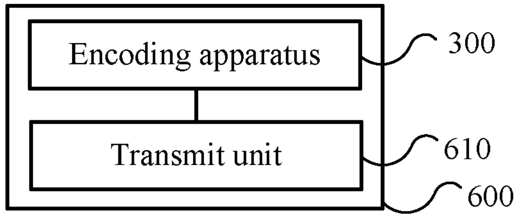
FIG. 6 is a block diagram that schematically shows a transmitter according to an embodiment of the present application.

FIG. 6 is a diagram block that schematically shows a transmitter 600 according to an embodiment of the present application. The transmitter 600 in FIG. 6 may include an encoding apparatus 300 shown in FIG. 3, and therefore, repeated description is omitted as appropriate. In addition, the transmitter 600 may further include a transmit unit 610, which is configured to allocate bits to a high frequency encoding parameter and a low frequency encoding parameter that are generated by the encoding apparatus 300 in order to generate a bit stream, and transmit the bit stream.

Figure 7:
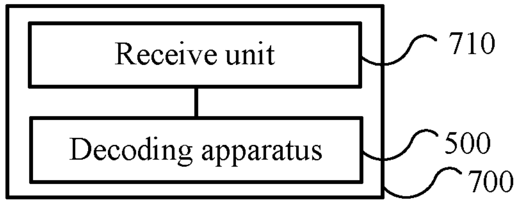
FIG. 7 is a block diagram that schematically shows a receiver according to an embodiment of the present application.

FIG. 7 is a block diagram that schematically shows a receiver 700 according to an embodiment of the present application. The receiver 700 in FIG. 7 may include a decoding apparatus 500 shown in FIG. 5, and therefore, repeated description is omitted as appropriate. In addition, the receiver 700 may further include a receive unit 710, which is configured to receive an encoding signal for processing by the decoding apparatus 500.

In another embodiment of the present application, a communications system is further provided, which may include a transmitter 600 that is described with reference to FIG. 6 or a receiver 700 that is described with reference to FIG. 7.

Figure 8:
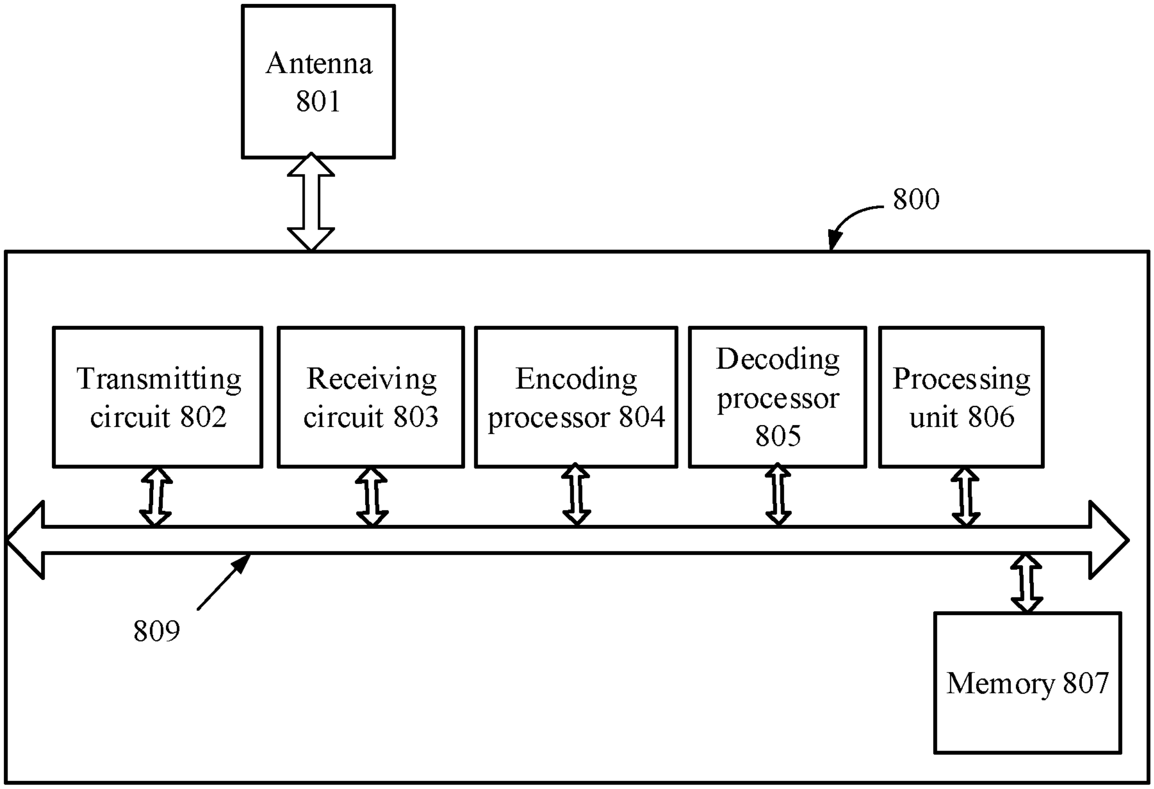
FIG. 8 is a schematic block diagram of an apparatus according to another embodiment of the present application.

FIG. 8 is a schematic block diagram of an apparatus according to another embodiment of the present application. An apparatus 800 of FIG. 8 may be used to implement steps and methods in the foregoing method embodiments. The apparatus 800 may be applied to a base station or a terminal in various communications systems. In the embodiment of FIG. 8, the apparatus 800 includes a transmitting circuit 802, a receiving circuit 803, an encoding processor 804, a decoding processor 805, a processing unit 806, a memory 807, and an antenna 801. The processing unit 806 controls an operation of the apparatus 800, and the processing unit 806 may further be referred to as a central processing unit (CPU). The memory 807 may include a read-only memory (ROM) and a random-access memory (RAM), and provides an instruction and data for the processing unit 806. Apart of the memory 807 may further include a non-volatile RAM (NVRAM). In an embodiment, the apparatus 800 may be built in a wireless communications device or the apparatus 800 itself may be a wireless communications device, such as a mobile phone, and the apparatus 800 may further include a carrier that accommodates the transmitting circuit 802 and the receiving circuit 803 in order to allow data transmitting and receiving between the apparatus 800 and a remote location. The transmitting circuit 802 and the receiving circuit 803 may be coupled to the antenna 801. Components of the apparatus 800 are coupled together using a bus system 809, where in addition to a data bus, the bus system 809 further includes a power bus, a control bus, and a status signal bus. However, for clarity of description, various buses are marked as the bus system 809 in a figure. The apparatus 800 may further include the processing unit 806 for processing a signal, and in addition, further includes the encoding processor 804 and the decoding processor 805.

The encoding method disclosed in the foregoing embodiments of the present application may be applied to the encoding processor 804 or be implemented by the encoding processor 804, and the decoding method disclosed in the foregoing embodiments of the present application may be applied to the decoding processor 805 or be implemented by the decoding processor 805. The encoding processor 804 or the decoding processor 805 may be an integrated circuit chip and has a signal processing capability. In an implementation process, steps in the foregoing methods may be completed by means of an integrated logic circuit of hardware in the encoding processor 804 or the decoding processor 805 or an instruction in a form of software. The instruction may be implemented or controlled by means of cooperation by the processing unit 806, and is used to execute the method disclosed in the embodiments of the present application. The foregoing decoding processor 805 may be a general purpose processor, a digital signal processor (DSP), an application-specific integrated circuit (ASIC), a field-programmable gate array (FPGA) or another programmable logic component, a discrete gate or a transistor logic component, or a discrete hardware assembly, and can implement or execute methods, steps, and logical block diagrams disclosed in the embodiments of the present application. The general purpose processor may be a microprocessor, and the decoding processor 805 may also be any processor, decoder, and the like. Steps of the methods disclosed with reference to the embodiments of the present application may be executed and completed using a hardware decoding processor, or may be executed and completed using a combination of hardware and software modules in the decoding processor. A software module may be located in a mature storage medium in the art, such as a RAM, a flash memory, a ROM, a programmable ROM (PROM), an electrically-erasable PROM (EEPROM), or a register. The storage medium is located in the memory 807, and the encoding processor 804 or the decoding processor 805 reads information from the memory 807, and completes the steps of the foregoing methods in combination with the hardware. For example, the memory 807 may store the obtained low frequency encoding parameter for use by the encoding processor 804 or the decoding processor 805 during encoding or decoding.

For example, an encoding apparatus 300 in FIG. 3 may be implemented by the encoding processor 804, and a decoding apparatus 500 in FIG. 5 may be implemented by the decoding processor 805.

In addition, for example, a transmitter 600 in FIG. 6 may be implemented by the encoding processor 804, the transmitting circuit 802, the antenna 801, and the like. A receiver 700 in FIG. 7 may be implemented by the antenna 801, the receiving circuit 803, the decoding processor 805, and the like. However, the foregoing example is merely exemplary, and is not intended to limit the embodiments of the present application on this implementation manner.

The memory 807 stores an instruction that enables the processing unit 806 and/or the encoding processor 804 to implement the following operations of dividing a to-be-encoded time-domain signal into a low band signal and a high band signal, performing encoding on the low band signal to obtain a low frequency encoding parameter, performing encoding on the high band signal to obtain a high frequency encoding parameter, obtaining a synthesized high band signal according to the low frequency encoding parameter and the high frequency encoding parameter, performing short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of the high band signal, and calculating a high frequency gain based on the high band signal and the short-time filtering signal. The memory 807 stores an instruction that enables the processing unit 806 or the decoding processor 805 to implement the following operations of differentiating a low frequency encoding parameter, a high frequency encoding parameter, and a high frequency gain from encoded information, performing decoding on the low frequency encoding parameter to obtain a low band signal, obtaining a synthesized high band signal according to the low frequency encoding parameter and the high frequency encoding parameter, performing short-time post-filtering processing on the synthesized high band signal to obtain a short-time filtering signal, where, compared with a shape of a spectral envelope of the synthesized high band signal, a shape of a spectral envelope of the short-time filtering signal is closer to a shape of a spectral envelope of a high band signal, adjusting the short-time filtering signal using the high frequency gain to obtain a high band signal, and combining the low band signal and the high band signal to obtain a final decoding signal.

The communications system or communications apparatus according to the embodiments of the present application may include a part of or all of the foregoing encoding apparatus 300, transmitter 600, decoding apparatus 500, receiver 700, and the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

What is claimed is:

1. A computer program product comprising instructions stored on a non-transitory computer-readable medium that, when executed by one or more processing devices, cause the one or more processing devices to:

obtain a low-band signal of a speech signal and a high-band signal of the speech signal;

encode the low-band signal to obtain a low frequency encoding parameter;

encode the high-band signal to obtain a linear predictive coding (LPC) parameter;

obtain, according to the low frequency encoding parameter and the LPC parameter, a synthesized high-band signal;

perform, using a pole-zero filter, filtering processing on the synthesized high-band signal to obtain a processed synthesized high-band signal, wherein a coefficient of the pole-zero filter is based on the LPC parameter; and perform, using a first-order filter, filtering processing on the processed synthesized high-band signal, wherein a z-domain transfer function of the first-order filter is $H_t(z)=1-\mu z^{-1}$.

2. The computer program product of claim 1, wherein μ is a preset constant.

3. The computer program product of claim 1, wherein μ is a value based on the LPC parameter and the synthesized high-band signal.

4. The computer program product of claim 1, wherein the instructions further cause the one or more processing devices to encode the high-band signal by:

encoding, using an LPC technology, the high-band signal to obtain an LPC coefficient; and setting the LPC coefficient as the LPC parameter, wherein a z-domain transfer function of the pole-zero filter is based on the following formula:

$$H_s(z) = \frac{1 - a_1\beta z^{-1} - a_2\beta^2 z^{-2} - \dots - a_M\beta^M z^{-M}}{1 - a_1\gamma z^{-1} - a_2\gamma^2 z^{-2} - \dots - a_M\gamma^M z^{-M}},$$

wherein $a_1, a_2, \ldots a_M$ is the LPC coefficient, wherein M represents a quantity of the LPC coefficient, and wherein β and γ satisfy a condition $0<\beta<\gamma<1$.

5. The computer program product of claim 4, wherein β=0.5, and wherein γ=0.8.

6. The computer program product of claim 1, wherein the instructions further cause the one or more processing devices to:

obtain an excitation signal according to the low frequency encoding parameter; and obtain the synthesized high-band signal according to the excitation signal and the LPC parameter.

7. A computer program product comprising instructions stored on a non-transitory computer-readable medium that, when executed by one or more processing devices, cause the one or more processing devices to:

obtain, from encoded information corresponding to a speech signal, a low frequency encoding parameter, a linear predictive coding (LPC) parameter, and a high frequency gain;

obtain, according to the low frequency encoding parameter, a low band signal of the speech signal;

obtain, according to the low frequency encoding parameter and the LPC parameter, a synthesized high-band signal;

perform, using a pole-zero filter, filtering processing on the synthesized high-band signal, to obtain a processed synthesized high-band signal, wherein a coefficient of the pole-zero filter is based on the LPC parameter;

perform, using a first-order filter, filtering processing on the processed synthesized high-band signal to obtain a short-time filtered signal;

adjust, using the high frequency gain, the short-time filtered signal to obtain a high-band signal; and combine the low band signal and the high-band signal to obtain a decoded signal, wherein a z-domain transfer function of the first-order filter is $H_t(z)=1-\mu z^{-1}$.

8. The computer program product of claim 7, wherein μ is a preset constant.

9. The computer program product of claim 7, wherein μ is a value based on the LPC parameter and the synthesized high-band signal.

10. The computer program product of claim 7, wherein the LPC parameter is an LPC coefficient from encoding using an LPC technology, and wherein a z-domain transfer function of the pole-zero filter is based on the following formula:

$$H_s(z) = \frac{1 - a_1\beta z^{-1} - a_2\beta^2 z^{-2} - \ldots - a_M\beta^M z^{-M}}{1 - a_1\gamma z^{-1} - a_2\gamma^2 z^{-2} - \ldots - a_M\gamma^M z^{-M}},$$

wherein $a_1, a_2, \ldots a_M$ is the LPC coefficient, wherein M represents a quantity of the LPC coefficient, and wherein β and γ satisfy a condition $0<\beta<\gamma<1$.

11. The computer program product of claim 10, wherein β=0.5, and wherein γ=0.8.

12. The computer program product of claim 7, wherein the low frequency encoding parameter comprises an algebraic codebook, an algebraic codebook gain, an adaptive codebook, an adaptive codebook gain, or a pitch period.

13. The computer program product of claim 7, wherein the speech signal is in a time domain or a frequency domain.

14. The computer program product of claim 7, wherein the instructions further cause the one or more processing devices to:

obtain an excitation signal according to the low frequency encoding parameter; and obtain the synthesized high-band signal according to the excitation signal and the LPC parameter.

15. A method comprising:

obtaining a low band signal of a speech signal and a high-band signal of the speech signal;

encoding the low band signal to obtain a low frequency encoding parameter;

encoding the high-band signal to obtain a linear predictive coding (LPC) parameter;

obtaining, according to the low frequency encoding parameter and the LPC parameter, a synthesized high-band signal;

performing, using a pole-zero filter, first filtering on the synthesized high-band signal to obtain a processed synthesized high-band signal, wherein a coefficient of the pole-zero filter is based on the LPC parameter; and performing, using a first-order filter, second filtering on the processed synthesized high-band signal, wherein a z-domain transfer function of the first-order filter is $H_t(z)=1-\mu z^{-1}$.

16. The method of claim 15, wherein μ is a preset constant.

17. The method of claim 15, wherein μ is a value obtained based on the LPC parameter and the synthesized high-band signal.

18. The method of claim 15, wherein encoding the high-band signal further comprises:

encoding, using an LPC technology, the high-band signal to obtain an LPC coefficient; and setting the LPC coefficient as the LPC parameter, wherein a z-domain transfer function of the pole-zero filter is based on the following formula:

$$H_s(z) = \frac{1 - a_1\beta z^{-1} - a_2\beta^2 z^{-2} - \ldots - a_M\beta^M z^{-M}}{1 - a_1\gamma z^{-1} - a_2\gamma^2 z^{-2} - \ldots - a_M\gamma^M z^{-M}},$$

wherein $a_1, a_2, \ldots a_M$ is the LPC coefficient, wherein M represents a quantity of the LPC coefficient, and wherein β and γ satisfy a condition $0<\beta<\gamma<1$.

19. The method of claim 18, wherein β=0.5, and wherein γ=0.8.

20. The method of claim 15, further comprising obtaining an excitation signal according to the low frequency encoding parameter, wherein obtaining the synthesized high-band signal, comprises obtaining, according to the excitation signal and the LPC parameter, the synthesized high-band signal.

* * * * *